United States Patent [19]

Nakane et al.

[11] Patent Number: 4,525,412
[45] Date of Patent: Jun. 25, 1985

[54] INFORMATION RECORDING MEDIUM

[75] Inventors: Yasuaki Nakane, Higashikana; Junichi Akamatsu, Kawagoe; Susumu Sakamoto, Matsudo; Tadashi Kiyomiya, Ageo, all of Japan

[73] Assignee: Sony Corporation, Tokyo, Japan

[21] Appl. No.: 549,741

[22] Filed: Nov. 8, 1983

[30] Foreign Application Priority Data

Nov. 15, 1982 [JP] Japan ................... 57-200238

[51] Int. Cl.³ .................. B32B 15/04; G01D 15/34
[52] U.S. Cl. ......................... 428/199; 346/135.1; 346/137; 428/209; 428/457; 428/913
[58] Field of Search ............. 428/913, 199, 195, 212, 428/457, 209; 346/135.1, 137

[56] References Cited

U.S. PATENT DOCUMENTS

| 4,397,923 | 8/1983 | Yasuda et al. | 428/913 X |
| 4,414,273 | 11/1983 | Wada et al. | 428/913 X |
| 4,460,636 | 7/1984 | Watanabe | 428/212 |

Primary Examiner—Thomas J. Herbert
Attorney, Agent, or Firm—Hill, Van Santen, Steadman & Simpson

[57] ABSTRACT

An information recording medium which includes a light-transmitting substrate, a recording layer formed on the substrate, the recording layer having the characteristic of changing an optical characteristic upon heating thereof, together with a protective layer having light-absorbing properties disposed over the recording layer and arranged to absorb light passing through the recording layer upon recording, in combination with a planar layer superimposed on the protective layer and capable of suppressing mechanical deformation of the recording layer.

6 Claims, 5 Drawing Figures

INFORMATION RECORDING MEDIUM

BACKGROUND OF THE INVENTION

1. Field of the Invention

The present invention relates to an information recording medium of the type suitable for use with an optical video disk, a digital audio disk, or the like.

2. Description of the Prior Art

At the present time, optical video disks, digital audio disks, and the like, have already been put into practical use. In general, in disks of this type, the user employs a disk only in reading out the information which has previously been recorded thereon. Recently, various information recording media have been proposed which would allow the user to write or record desired information on the medium. These information recording media, however, are not yet in widespread use.

The previously proposed information recording medium capable of recording information utilizes as its recording material layer a thin metal film having a low melting point and composed, for example, of bismuth and tellurium. This thin metal film is irradiated with a laser beam in response to the information signal and then melted. In the melted portion of the thin metal film, record pits are formed by apertures or recesses as the mechanical change of shape occurs and the information is thus recorded. However, when the information recording is being carried out with the formation of the record pits as mentioned, a large amount of power is required to carry out the recording of information by melting of the recording layer. Moreover, it is difficult to control the shape of the recorded pits formed by the melting so that the noise level becomes high and the resolution becomes low. Also, it is difficult in this way to carry out high density recording.

The assignee of the present application has previously proposed an information recording medium which can perform information recording on the basis of a change of optical characteristics of the recording medium. Such a disclosure will be found, for example, in the copending application of Watanabe, Ser. No. 361,384, filed Mar. 24, 1982 and assigned to the same assignee as the present application, and issued as U.S. Pat. No. 4,460,636 on July 17, 1984.

SUMMARY OF THE INVENTION

The present invention is directed to the production of an improved information recording medium. It provides a novel medium which records information on the basis of change of optical characteristics of a recording layer and is characterized by a recording sensitivity which is not lowered and a recording which has a high C/N (carrier to noise) ratio.

The present invention also provides an information recording medium which has excellent durability and mechanical characteristics. The medium is suitable for use with an optical video disk, a digital audio disk, or similar system.

In accordance with the present invention, there is provided an information recording medium having a substrate and a recording layer formed thereon in which the recording is made by heating as with a laser beam to accomplish a change of optical characteristics of the recording medium, in combination with a protective film having a light-absorbing property which absorbs light passing through the recording layer upon recording, and a planar member superposed thereon and suppressing mechanical deformation of the recording layer.

DESCRIPTION OF THE PREFERRED EMBODIMENTS

Figure 1:
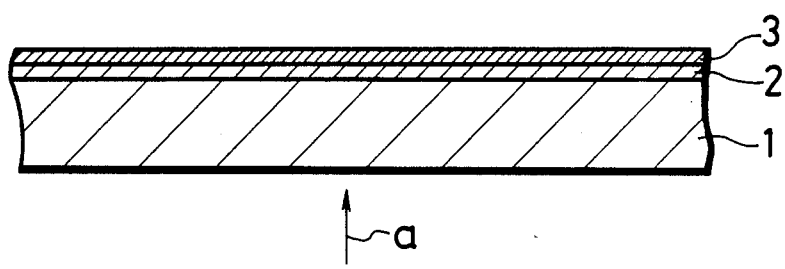
FIG. 1 is a greatly enlarged cross-sectional view illustrating an example of a conventional information recording medium.

As shown in FIG. 1, a typical prior art structure includes a substrate 1 composed of an optically transmissive material such as polymethyl methacrylate or the like over which there is formed a recording layer 2 composed, for example, of a 400 Å thick layer composed of $Sb_2Se_3$ as an optical recording layer. Over the optical recording layer 2 there is a light-absorbing and reflecting layer 3 having a thickness, for example, of 400 Å and made of $Bi_2Te_3$. Along the direction indicated by the arrow a in FIG. 1, a writing or recording light, for example, a semiconductor laser light which is modulated in accordance with the information to be recorded is irradiated on the recording medium to convert the light energy of the laser light to heat energy in the recording layer 2 and thus cause a change in the optical characteristics thereof such as optical transmissivity and reflectivity. This change occurs in the pattern associated with the recording information and thus the information is recorded as the so-called optical record pits.

Figure 2:
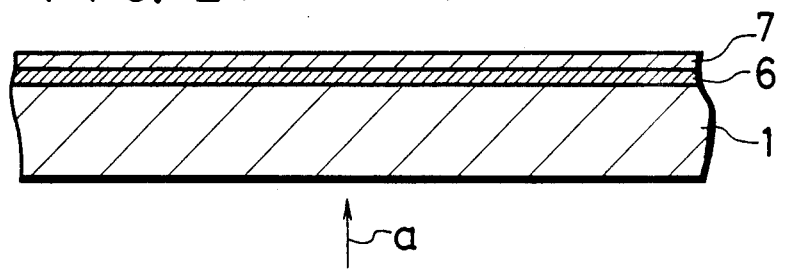
FIG. 2 is a view similar to FIG. 1 of a modified form of conventional information recording medium.

Another example of a previously proposed information recording medium is shown in FIG. 2. This form contains a substrate 1 having optical transmissivity over which there is deposited a reflection preventive layer 6 having a thickness, for example, of 400 Å. This layer may be made of $Sb_2Se_3$ over which there is deposited a recording layer 7 having a thickness, for example, of 400 Å and composed of $Sb_2Te_3$. Along the direction indicated by the arrow a in FIG. 2, a writing or recording light such as a semiconductor laser light which is modulated in accordance with the information to be recorded is irradiated on the recording medium from the side of the substrate 1 to convert the light energy to heat energy in the recording layer 7. The optical characteristics such as optical transmissivity and reflectivity in the recording layer 7 are thus changed in accordance with a pattern corresponding with the recording information, the information being recorded as the so-called optical record pits.

Figure 3:
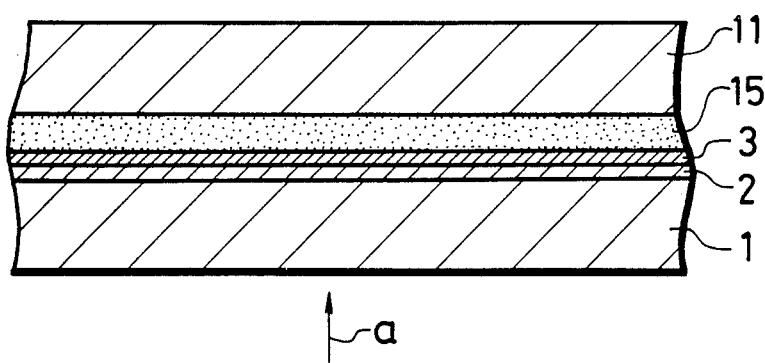
FIG. 3 is a greatly enlarged cross-sectional view of an information recording medium used to explain the present invention.

As shown in FIG. 3, with these information recording media, for example, the structure shown in FIG. 1, in order to obtain chemical stability thereof, the surface thereof or the light-absorbing and reflecting layer 3 is coated with a protective film 15 on which there is a planar transparent substrate 11 similar to the substrate 1. This substrate is bonded to the underlying layer to improve the mechanical characteristics thereof. The protective film 15 is normally composed of a resin which is hardened by exposure to ultraviolet light, namely, a so-called UV resin. In the example shown in FIG. 3, the semiconductor laser light used as the recording light is introduced into the protective film 15 through the interface or boundary between the light-absorbing and reflecting layer 3 and the protective film 15 made of the UV resin so that a multiplex reflection is not carried out in the light-absorbing and reflecting layer 3. This lowers the recording sensitivity of the recording medium. The recording light thus introduced must pass through the protective film 15 made of UV resins so that a loss of energy becomes significant.

Figure 4:
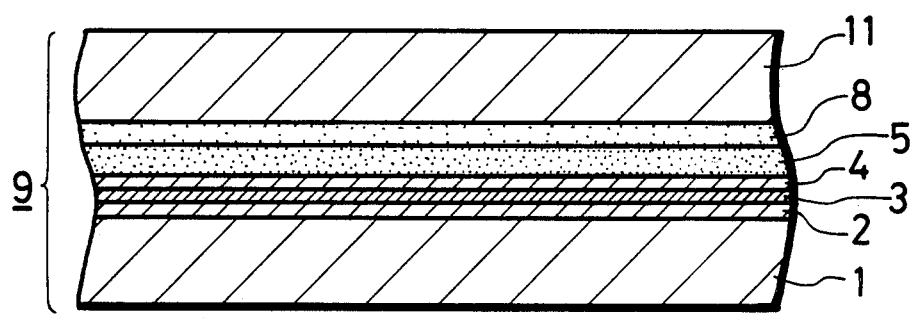
FIG. 4 is a greatly enlarged cross-sectional view of one embodiment of the present invention.

An embodiment of the information recording medium according to the present invention will now be described with reference to FIG. 4. In this embodiment, the invention is applied to the type of information recording medium which is shown in FIG. 1. In FIG. 4, parts corresponding with those of FIG. 1 are given the same reference numerals and therefore will not be described in detail. According to the embodiment of the invention shown in FIG. 4, the substrate 1 may be made, for example, of polymethyl methacrylate having optical transmissivity. On this substrate 1 there is deposited a recording layer 2 having a thickness, for example, of 400 Å and composed of $Sb_2Se_3$. The deposition may be made by vacuum evaporation or sputtering or other suitable deposition process. A light-absorbing and reflecting layer 3 having a thickness, for example, of 200 Å and composed of $Bi_2Te_3$, is similarly deposited by vacuum evporation or the like. A high-melting point metal or metal alloy layer 4 composed of a metal or alloy such as $In_2Te_3$, Mn, Ni, Cr, an Ni-Cr alloy, an Mn-Cr alloy, or an Mn-Cu-Ni alloy or the like is deposited on the light-absorbing and reflecting layer 3 by vacuum evaporation, sputtering, or similar process to a thickness of, for example, 150 Å. The melting point of the high-melting layer 4 should exceed the melting point of reflecting layer 3 which in the case of $Bi_2Te_3$ is 585° C. and preferably should exceed that melting point by at least 100° C. The purpose of the high-melting layer 4 is to suppress mechanical deformations at least in the recording layer 2 and in the reflecting layer 3.

Subsequently, on the high-melting point metal layer 4 there is deposited a protective film 5 made of a phthalocyanine such as the organic pigment phthalocyanine lead having an absorption band (in the vicinity of 8000 Å) corresponding to the semiconductor laser wavelength band. This layer can be applied by vacuum evaporation, sputtering, or the like to a thickness ranging from 2000 Å to 2 microns, more preferably, from 5000 Å to 1 micron.

When phthalocyanine copper pigment is deposited as a film on the protective film 5, its function as a protective film can be improved. Then, by the use of a double-sided adhesive tape of the acrylic type or an adhesive agent 8 such as a styrene-butadiene polymer adhesive which does not dissolve the protective film 5, a transparent substrate 11, the same as the substrate 1, is bonded to a laminate layer structure member 9 which consists of the substrate 1, the recording layer 2, the light-absorbing and reflecting layer 3, the high-melting point metal layer 4, and the protective film 5.

Figure 5:
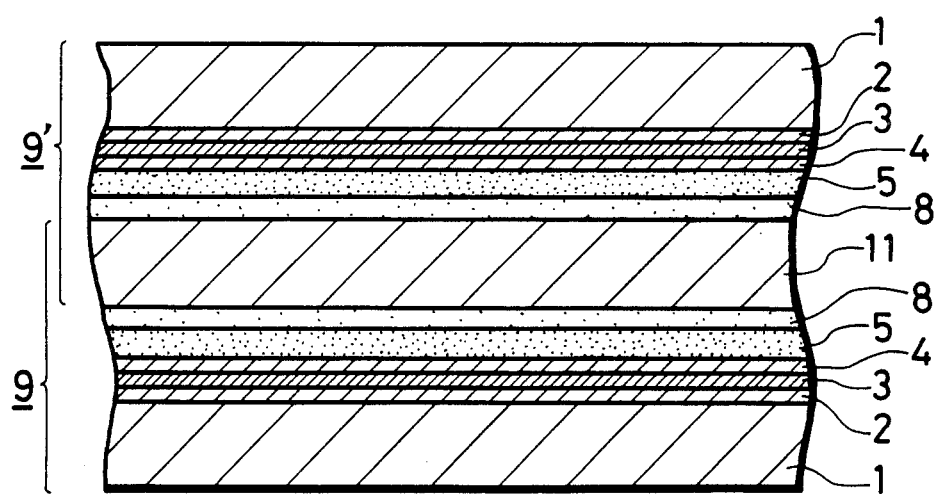
FIG. 5 is a greatly enlarged cross-sectional view of a second form of the present invention.

Alternatively, as shown in FIG. 5, the information recording member can be constructed by bonding a structure member 9' the same as the structure member 9 in FIG. 4 to form a double-ended recording medium consisting of two identical halves.

While in FIGS. 4 and 5 the present invention is applied to an information recording medium of the construction shown in FIG. 1, it is apparent that the present invention can be applied to the information recording medium of the construction shown in FIG. 2.

Since according to the present invention a protective film 5 having a pigment is employed, it is possible to reduce the noise caused by the light reflected on the surface of the protective film 5. In general, when the protective film is formed by a resin film the spinner method is usually employed. As a result, the film thickness of the protective film is made small and the surface thereof is formed with irregularities and not uniform so that there is a risk that a noise will be caused by the return reflection of transmitted light of the writing and reading light from the surface of the protective film. Therefore, in this case it may be necessary for the protective film to have its thickness increased up to approximately 1 mm so that it would not be affected by the optical reflection on the surface thereof.

When the light absorptive pigment mentioned above is mixed into the protective film, the protective film can effectively absorb the transmitted light without increasing the thickness thereof, thus effectively preventing the noise from being caused by the reflected light.

Moreover, the reinforcing film can be bonded to the recording medium or the disks of the same construction can be bonded together by a simple bonding means so that a disadvantage of releasing and the like associated with the increased thickness of the protective film can be avoided. This results in an improvement of the mechanical characteristics of the disk-shaped recording medium, such as strength, warp resistance, and the like.

In the recording medium of the present invention, since the protective film 5 having an infrared light-absorbing property is deposited on the surface of the recording medium or the high-melting point metal layer 4, upon transmitting the information on the recording layer 2 or 7, the transmitted light can be effectively absorbed thereby and so the reflected light is avoided and the C/N ratio does not have to be lowered.

Moreover, since the absorbed light constitutes a source of heat and helps the heating of the adjoining light-absorbing and reflecting layer 3 and the recording layer 2, it is possible to prevent the recording sensitivity from being lowered.

Furthermore, since the protective film absorbs almost all of the transmitted light, a mechanical deformation preventing film can be bonded by a simple bonding method and then fixed. Consequently, a double-sided recording structure of the type shown in FIG. 5 can be formed with ease.

The above description is directed to the preferred embodiments of the invention, but it will be apparent that many modifications and variations can be effected by one skilled in the art without departing from the spirit or scope of the novel concepts of the invention, so that the scope of the invention should be determined by the appended claims only.

We claim as our invention:
1. An information recording medium comprising:
a light-transmitting substrate,
a recording layer formed on said substrate, said recording layer having the characteristic of changing an optical characteristic when an incident recording light is converted to heat therein,
a protective layer having light-absorbing properties coated over said recording layer and arranged to absorb said recording light passing through said recording layer upon recording, and a planar layer superimposed on said protective layer and capable of suppressing mechanical deformation of said recording layer.

2. A medium according to claim 1 wherein said protective layer comprises phthalocyanine lead.

3. A medium according to claim 1 which includes a light-absorbing and reflecting layer overlying said recording layer.

4. A medium according to claim 3 wherein said protective layer is a metal or alloy consisting of at least one of the following:

$In_2Te_3$, Mn, Ni, Cr, an Ni-Cr alloy, an Mn-Cr alloy, or an Mn-Cu-Ni alloy, each having a melting point above the melting point of said light-absorbing and reflecting layer.

5. A medium according to claim 1 in which said planar layer comprises a substrate and a recording layer formed thereon.

6. A medium according to claim 5 in the form of a two-sided recording medium.

* * * * *